F. W. MILLER.
GLASS MOLDING.
APPLICATION FILED JUNE 4, 1919.

1,368,958. Patented Feb. 15, 1921.

Witnesses:

Inventor
Frederick W. Miller
by
James L. Norris,
Attorney

UNITED STATES PATENT OFFICE.

FREDERICK W. MILLER, OF HOCKLEY HEATH, ENGLAND.

GLASS-MOLDING.

1,368,958.   Specification of Letters Patent.   Patented Feb. 15, 1921.

Application filed June 4, 1919. Serial No. 301,756.

*To all whom it may concern:*

Be it known that I, FREDERICK WILLIAM MILLER, subject of the King of Great Britain, residing at Hockley Heath, county of Warwick, England, have invented certain new and useful Improvements in Glass-Molding, of which the following is a specification.

This invention relates to the molding of glass and ceramic enamels such as cameos and the like.

The object of the present invention is to provide an improved and simplified process of molding which does not require the use of highly skilled labor, and which results in the production of more sharply-defined and better finished articles than are produced by existing processes.

According to the invention the articles are molded by placing powdered or comminuted glass or enamel in a thin metal mold and fusing the same, and after the glass or enamel has been allowed to cool the mold is dissolved or removed therefrom by suitable means. In the production of an article in relief in two colors, such as a cameo, the recessed part of the mold is filled in with powdered glass or enamel of the desired color for the raised design, and the remainder of the mold is filled up with powdered glass or enamel of another color to form the background, when the whole is fused together. By a similar process more than two colors may be obtained.

Figure 1 of the accompanying drawings represents a plan of the mold which is employed.

Figure 1:
Figure 2:
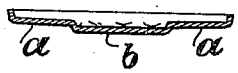
Fig. 2 is a cross-section on line $x$, Fig. 1.
Figure 3:
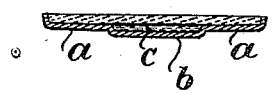
Fig. 3 is a section showing the mold filled in with the powdered glass prior to fusing.
Figure 4:
Fig. 4 shows the finished cameo or the like after the mold has been dissolved away.

In carrying out the molding of a glass or enamel article in accordance with this invention a mold $a$ is used consisting of a thin metal shell preferably made of sheet copper and produced by a stamping or pressing operation, or by electro-deposition. The bottom of the mold is recessed or sunken at $b$ according to any desired design in order to form the raised or embossed portion of the article.

If the said article is to be of one color only, then the mold is filled with finely powdered glass or enamel (in either a dry or wet state) which is then fused in the mold, and allowed to cool slowly.

Where, however, the raised portion of the cameo or the like is to be of a different color from that of the background, then to produce the raised part the recess $b$ is first filled in with finely ground opaque glass or enamel $c$ of the desired color (for instance white), and in a wet state, being mixed with water to form a paste. To form the background the remainder of the mold is filled up with powdered glass or enamel of a different color, and in a dry state. The whole is fused together and then allowed to cool slowly in the mold.

More than two colors may be obtained by filling the recesses in different planes of the mold with powdered glass of different colors.

When the molded glass or enamel is quite cold the mold is dissolved by placing it in an acid bath for a short time, leaving the article with the design perfectly sharp and well-defined. Instead of removing the mold by placing it in an acid bath, it may be dissolved away by electrolysis, being used as an anode.

The metal or metal salts may be recovered from the acid bath by any known or suitable process.

Having fully described my invention, what I desire to claim and secure by Letters Patent is:—

1. A method of molding consisting in fusing powdered or comminuted material in a metal mold thereby causing the fused material to adhere to the mold and dissolving the mold from the fused material.

2. A method of molding glass and ceramic enamel consisting in fusing powdered or comminuted glass in a metal mold comprising a thin sheet-metal shell, and dissolving the mold from the fused material.

3. A method of molding articles of glass and ceramic enamel in more than one color, consisting in placing powdered glass of different colors in recesses in different planes of a thin sheet-metal mold, fusing the whole together, and dissolving the mold from the article.

4. A method of molding articles of glass and ceramic enamel in more than one color consisting in placing powdered material in recesses in a thin sheet metal mold, in placing strata of different colored material in powdered form on the material in said recesses, in fusing the whole together and in dissolving the metal mold by electrolysis.

In testimony whereof I have hereunto set my hand in presence of two subscribing witnesses.

F. W. MILLER.

Witnesses:
W. N. SKERRETT,
W. S. SKERRETT.